United States Patent
Kuehne

(10) Patent No.: US 10,607,418 B2
(45) Date of Patent: Mar. 31, 2020

(54) METHOD FOR OPERATING A DISPLAY SYSTEM AND DISPLAY SYSTEM

(71) Applicant: AUDI AG, Ingolstadt (DE)

(72) Inventor: Marcus Kuehne, Beilngries (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 16/306,453

(22) PCT Filed: May 4, 2017

(86) PCT No.: PCT/EP2017/060658
§ 371 (c)(1),
(2) Date: Nov. 30, 2018

(87) PCT Pub. No.: WO2017/207207
PCT Pub. Date: Dec. 7, 2017

(65) Prior Publication Data
US 2019/0130653 A1    May 2, 2019

(30) Foreign Application Priority Data
Jun. 2, 2016    (DE) .................. 10 2016 006 767

(51) Int. Cl.
*G06T 19/00*    (2011.01)
*G06F 3/01*    (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
CPC ............ G02B 27/017; G02B 2027/014; G02B 2027/0141; G02B 2027/0167;
(Continued)

(56) References Cited

U.S. PATENT DOCUMENTS

2002/0130862 A1    9/2002    Lee et al.
2011/0261083 A1    10/2011    Wilson
(Continued)

FOREIGN PATENT DOCUMENTS

DE    102011013760 A1    9/2012
DE    102014009701 A1    12/2015
(Continued)

OTHER PUBLICATIONS

Ai, Z., Hawkey, K., & Brooks, S. (Feb. 2016). "Scale-based Exploded Views: A Selection Method for Mobile Devices". In Proceedings of the 17th International Workshop on Mobile Computing Systems and Applications (pp. 27-32). ACM (Year: 2016).*
(Continued)

*Primary Examiner* — Diane M Wills
(74) *Attorney, Agent, or Firm* — Staas & Halsey LLP

(57) ABSTRACT

A virtual object arranged in a virtual environment is displayed by virtual reality glasses worn by a person. A virtual hand is positioned within the virtual environment in accordance with a hand detected in the real environment. As the virtual hand dips into an area of the virtual object, the representation of the area is changed.

14 Claims, 3 Drawing Sheets

(51) Int. Cl.
  *G06T 13/20* (2011.01)
  *G06Q 10/00* (2012.01)
  *G02B 27/01* (2006.01)

(52) U.S. Cl.
  CPC ............ *G06F 3/017* (2013.01); *G06Q 10/20* (2013.01); *G06T 13/20* (2013.01); *G02B 2027/014* (2013.01); *G02B 2027/0187* (2013.01); *G06T 2200/04* (2013.01)

(58) Field of Classification Search
  CPC . G02B 2027/0187; G06F 3/011; G06F 3/017; G06T 13/20; G06T 19/006; G06T 19/20
  See application file for complete search history.

(56) References Cited

U.S. PATENT DOCUMENTS

| | | |
|---|---|---|
| 2012/0117514 A1 | 5/2012 | Kim et al. |
| 2014/0104274 A1 | 4/2014 | Hilliges et al. |
| 2014/0204002 A1 | 7/2014 | Bennet et al. |
| 2015/0062003 A1 | 3/2015 | Rafii et al. |
| 2015/0258432 A1 | 9/2015 | Stafford et al. |
| 2015/0278999 A1 | 10/2015 | Summers et al. |
| 2017/0124770 A1* | 5/2017 | Vats .................... G06T 19/00 |

FOREIGN PATENT DOCUMENTS

| | | |
|---|---|---|
| DE | 2016006767.5 | 6/2016 |
| WO | 2015/140816 A1 | 9/2015 |
| WO | PCT/EP2017/060658 | 5/2017 |

OTHER PUBLICATIONS

Cashion, Jeffrey, Chadwick Wingrave, and Joseph J. LaViola. "Optimal 3D selection technique assignment using real-time contextual analysis." 2013 IEEE Symposium on 3D User Interfaces (3DUI). IEEE, 2013 (Year: 2013).*
Zhai, Shumin, William Buxton, and Paul Milgram. "The silk cursor: Investigating transparency for 3D target acquisition." CHI. vol. 94. 1994 (Year: 1994).*
Kiyokawa, Kiyoshi, and Haruo Takemura. "A tunnel window and its variations: Seamless teleportation techniques in a virtual environment." HCI International. 2005 (Year: 2005).*
Vanacken, Lode, Tovi Grossman, and Karin Coninx. "Exploring the effects of environment density and target visibility on object selection in 3D virtual environments." 2007 IEEE symposium on 3D user interfaces. IEEE, 2007 (Year: 2007).*
English Translation by WIPO of the International Preliminary Report on Patentability dated Aug. 6, 2018 in corresponding International Patent Application No. PCT/EP2017/060658.
International Search Report for PCT/EP2017/060658 dated Jul. 14, 2017.
Wilmot Li et al.; "Automated Generation of Internet 3D Exploded View Diagrams"; ACM Transactions on Graphics, vol. 27, No. 3, Article 101, Aug. 2008; pp. 101:1-101:7.
German Office Action for Application No. 10 2016 006 767.5 dated Feb. 3, 2017.
English Translation by WIPO dated Mar. 26, 2018 of the International Preliminary Report on Patentability in corresponding International Patent Application No. PCT/EP2016/081104.

* cited by examiner

METHOD FOR OPERATING A DISPLAY SYSTEM AND DISPLAY SYSTEM

CROSS REFERENCE TO RELATED APPLICATIONS

This application is the U.S. national stage of International Application No. PCT/EP2017/060658, filed May 4, 2017 and claims the benefit thereof. The International Application claims the benefit of German Application No. 10 2016 006 767.5 filed on Jun. 2, 2016, both applications are incorporated by reference herein in their entirety.

BACKGROUND

Described below are a method for operating a display system and a display system.

Display systems that have virtual reality goggles that display a virtual object arranged in virtual surroundings can be displayed are already known. Display systems of this kind may furthermore also be designed to detect the hands of a person within the real surroundings. As such, US 2015/062003 A1, for example, shows a display system having electronic data goggles, wherein a wide variety of gestures by a wearer of the electronic data goggles can be detected. As such, it is possible, by way of example, to display a computer game in the form of a virtual game of tennis, wherein the wearer of the electronic data goggles can hit a virtual tennis ball by appropriate gestures and hand movements.

Furthermore, it is already known per se that users can manipulate a virtual vehicle, for example, by appropriately detected gestures. Such an approach is shown by US 2015/278999 A1, for example, wherein a user can perform a wide variety of gestures that are detected and, by way of example, cause a door of a displayed virtual motor vehicle to be opened, buttons in the cockpit of the virtual motor vehicle to be pushed or the displayed virtual vehicle to be rotated, so that the perspective of the vehicle is altered.

Further, DE 10 2011 013 760 A1 also shows a method for conveying information in which a smartphone can be used to show supplementary information such that the supplementary information is displayed as an overlay on the real component of a vehicle in the form of an augmented reality on a display of a smartphone. This is useful, for example, in order to provide a user with instructions for operating a component of the motor vehicle, which assists the user in repairing particular components of the motor vehicle.

A particular challenge for the depiction of virtual objects by virtual reality goggles is providing a wearer of the virtual reality goggles with a simple way of manipulating the displayed virtual object and of altering his perspective of the virtual object.

SUMMARY

Described below are a method for operating a display system and a display system by which a wearer of virtual reality goggles is enabled, in a particularly simple manner, to look at and manipulate the displayed virtual object in a wide variety of ways.

The method for operating a display system involves a virtual object arranged in virtual surroundings being displayed by virtual reality goggles that have been put on by a person. In this instance, at least one hand of the person is detected in the real surroundings. There is provision in this instance for a virtual hand to be positioned within the virtual surroundings in accordance with the hand detected in the real surroundings and for the depiction of that area of the virtual object that the virtual hand enters to be altered.

In this instance, it is possible for both hands of the person who has put on the virtual reality goggles also to be continually detected, in which case a respective left and right virtual hand are also positioned within the virtual surroundings in accordance with the detected left and right hands. The positioning of the virtual hand within the virtual surroundings does not necessarily mean that the virtual hand is also displayed by the virtual reality goggles, however. Hand movements and the positioning of the hand are thus at least detected and converted into corresponding hand movements and hand positionings within the virtual surroundings.

The method thus provides the wearer of the virtual reality goggles with a way of simply moving his hands as a whole or partly moving the hands, for example moving his fingers, to display those areas of the virtual object that his hand virtually enters in altered fashion. The alteration of the depiction of that area of the virtual object that the virtual hand enters is altered only if this area is also currently displayed by the virtual reality goggles, however. The virtual object is in this instance displayed from a virtual observation position that is continually adapted on the basis of the position detection of the virtual reality goggles and the detected orientation of the virtual reality goggles. If the wearer of the virtual reality goggles moves his head, for example, by turning his head to the left or right, for example, then his perspective of the virtual object also changes. Equally, his perspective of the virtual object changes should the wearer of the virtual reality goggles move away. The arrangement and movement of his hands thus affects the depiction of the virtual object only if he would also see his hands in reality. If he has arranged his hands such that he would not see them in reality, for example, then the depiction of the virtual object also does not change, since only that area of the virtual object that the person is also actually looking at is actually displayed, of course.

One advantageous embodiment provides for the virtual hand to be displayed within the virtual surroundings by the virtual reality goggles. This simplifies the alteration of the depiction of that area of the virtual object that the virtual hand enters, since the wearer of the virtual reality goggles has the virtual hand displayed in the virtual surroundings too. However, the virtual hand is also displayed by the virtual reality goggles only if the wearer of the virtual reality goggles has positioned his hand or hands such that he would also see it or them in reality with the virtual reality goggles removed. This results in a particularly intuitive opportunity for control and manipulation by virtue of appropriate alteration of the hand position.

A further advantageous embodiment provides for the area of the virtual object into which the virtual hand moves to be turned partially or completely transparent. In this instance, turning partially transparent is intended to be understood to mean that the whole area of the virtual object into which the virtual hand moves is displayed semitransparently, which means that this area of the virtual object is already invisible, but areas beneath are likewise displayed, for example. At least the area of the virtual object into which the virtual hand moves may be partially or completely hidden. The wearer of the virtual reality goggles can therefore easily hide, or at least display semitransparently, structures of the virtual object that he currently does not wish to see without having to move his head in this direction.

In a further advantageous configuration, there is provision for an enveloping body, in particular a spherical enveloping body, to be placed around the virtual hand and additionally for the area of the virtual object into which the enveloping body moves to be turned partially or completely transparent. Therefore, a larger area of the virtual object is thus displayed semitransparently or completely transparently if the wearer of the virtual reality goggles moves his hand into this area as appropriate within the virtual surroundings. The enveloping body may in this instance be a multiple of the dimensions of the hands of the wearer of the virtual reality goggles, for example, so that a particularly large portion of the virtual object is hidden if the wearer of the virtual reality goggles virtually puts his hands into the virtual object.

In a further advantageous configuration, there is provision for inner structures of the virtual object that were not yet visible before the area was turned partially or completely transparent to be displayed after the area is turned partially or completely transparent. The wearer of the virtual reality goggles can thus use appropriate hand movements to make it possible for him to look more or less into the inside of the displayed virtual object, simply by virtually putting his hands into areas of the displayed virtual object that are of appropriate interest to him. In this context, there may also be provision, by way of example, for him to be able to more or less use his hands to open, unfold or tear the virtual object in order to obtain a view of the inner structures of the virtual object. The wearer of the virtual reality goggles can thus open or tear surfaces of the displayed virtual object by appropriate hand movements, wherein he can tear or open any surfaces of the virtual object even if in reality it would be completely impossible to open the surface at this juncture without destroying the surface. If the displayed virtual object is a virtual motor vehicle, for example, then the wearer of the virtual reality goggles can first of all put his hands into a part of the bodywork by an appropriate movement, for example, and, by moving them apart, tear apart the part of the bodywork and thus obtain a view of the underlying structures.

According to a further advantageous embodiment, there is provision for the area of the virtual object into which the virtual hand is moved to be displayed broken down into its individual components in the form of an explosion animation. Therefore, the wearer of the virtual reality goggles can, according to this alternative advantageous embodiment, also use an appropriate movement of his hand or of his hands to cause a particular assembly of the displayed virtual object to be displayed broken down into its individual parts in a kind of explosion depiction, for example. This may be of interest for both sales and development applications, the latter when different developers wish to share their knowledge of the design of individual components of the relevant virtual object, for example. By way of example, there may be provision for the wearer of the virtual reality goggles to first of all virtually grasp a particular assembly by appropriate movement of his hands and, when his hands are closed, to be able to virtually pull apart the assembly by moving his hands apart in opposite directions, as a result of which the assembly is displayed broken down into its individual parts in the form of an explosion depiction. The further apart the wearer of the virtual reality goggles moves his hands, the further apart the individual components of the assembly virtually grasped at present are moved.

In a further advantageous configuration, there is provision for gestures by the person that are performed with his hand to be detected and applicable pointing or manipulation actions to be performed within the displayed virtual surroundings and/or on the virtual object. The wearer of the virtual reality goggles is thus not just able to obtain a view of otherwise concealed inner structures of the virtual object by putting his hands into the applicable areas, but is additionally also able to effect particular pointing or manipulation actions by performing predetermined gestures. In this context, there may be provision for, as soon as an extended index finger is detected, a virtual pointer or laser pointer that virtually lengthens a finger axis of the index finger to be displayed within the virtual surroundings. As such, the wearer of the virtual reality goggles can point to a wide variety of components of the displayed virtual object, for example. This may be advantageous in particular if further people have likewise put on virtual reality goggles, for example, and likewise have this displayed.

A further advantageous embodiment provides for a virtual element detected in accordance with a grasping gesture performed by the fingers to be grasped and moved within the virtual surroundings in accordance with a movement performed with the hand. By way of example, the virtual element may be a component of the displayed virtual object or may be another object arranged within the virtual surroundings. The wearer of the virtual reality goggles can thus grasp and move a wide variety of displayed virtual elements within the virtual surroundings by performing appropriate grasping gestures and movements of his hand or of his hands.

The display system uses virtual reality goggles, which can be put on by a person, for displaying a virtual object arranged in virtual surroundings. In addition, the display system has a detection device for detecting at least one hand of the person in the real surroundings. In this instance, the display system is distinguished in that the display system has a control device that is designed to position a virtual hand within the virtual surroundings in accordance with the hand detected in the real surroundings and to alter the depiction of that area of the virtual object that the virtual hand enters. Advantageous configurations of the method can be regarded as advantageous configurations of the display system, the display system in particular performing the method.

Further advantages, features and details are obtained from the description of exemplary embodiments that follows and on the basis of the drawing. The features and combinations of features cited in the description above and the features and combinations of features cited in the description of the figures that follows and/or shown in the figures alone are usable not only in the respectively indicated combination but also in other combinations or on their own without departing from the scope of the invention.

BRIEF DESCRIPTION OF THE DRAWINGS

These and other aspects and advantages will become more apparent and more readily appreciated from the following description of the exemplary embodiments, taken in conjunction with the accompanying drawings, of which.

DETAILED DESCRIPTION OF THE PREFERRED EMBODIMENT

In the figures, elements that are the same or that have the same function are provided with the same reference signs.

Figure 1:
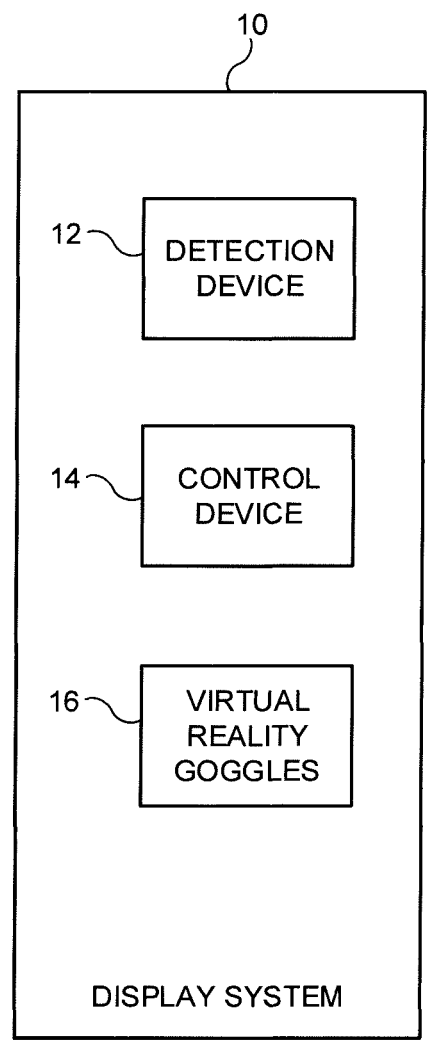
FIG. 1 is a schematic block diagram of a display system having virtual reality goggles, a detection device for detecting hand movements of a wearer of the virtual reality goggles and a control device for actuating the virtual reality goggles.

A display system 10 for displaying a wide variety of virtual objects and virtual surroundings is shown in a schematic depiction in FIG. 1. The display system 10 includes virtual reality goggles 12, a control device 14 for actuating the virtual reality goggles 12 and a detection device 16.

Figure 2:
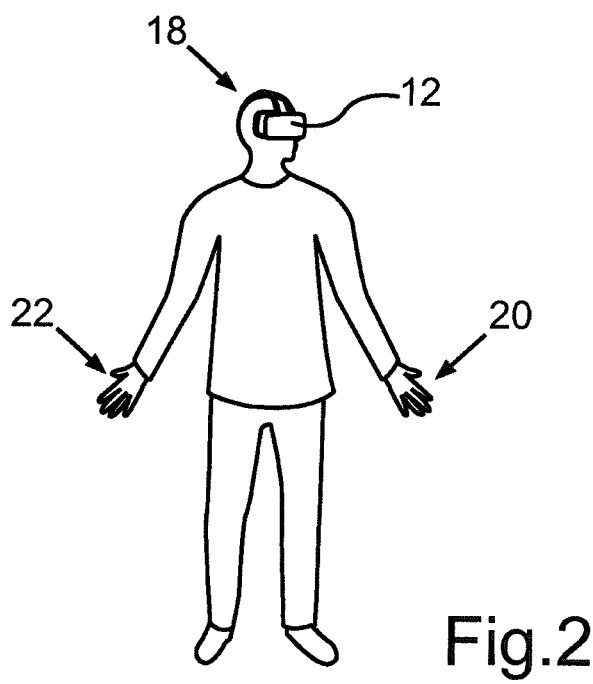
FIG. 2 is a schematic block diagram of a person who has put on the virtual reality goggles.

FIG. 2 shows a person 18 who has put on the virtual reality goggles 12. The detection device 16 is designed to detect the hands 20, 22 of the person 18. In this instance, the detection device 16 may be mounted directly on the outside of the virtual reality goggles 12, for example. The detection device 16 may be arranged on the virtual reality goggles 12 such that the detection device 16 has substantially the same detection area as the person 18 would see his surroundings with the virtual reality goggles 12 removed. That is to say that the detection device 16 can also detect the hands 20, 22 only if the person has oriented his hands 20, 22 and his head such that he could also see his hands 20, 22 with the virtual reality goggles 12 removed.

Figure 3:
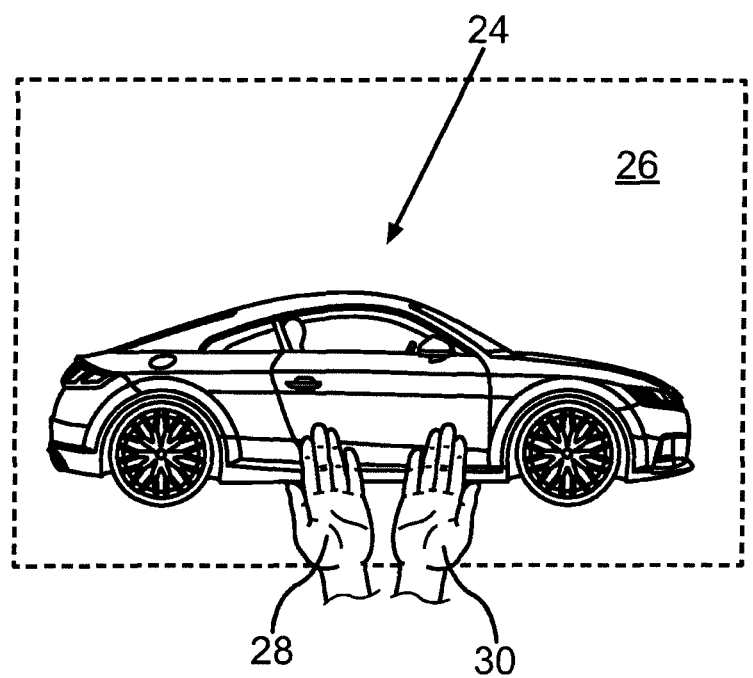
FIG. 3 is a schematic block diagram of a virtual motor vehicle arranged in virtual surroundings and displayed by the virtual reality goggles, wherein hands of the wearer of the virtual reality goggles that are detected by the detection device are additionally displayed within the virtual surroundings.

FIG. 3 depicts a virtual motor vehicle 24 arranged within virtual surroundings 26. The virtual motor vehicle 24 is displayed by the virtual reality goggles 12. The perspective of the virtual motor vehicle 24 changes in this instance in accordance with the movements of the person 18 who has put on the virtual reality goggles 12. If the person 18 turns his head to the left or right, for example, then his eyes also accordingly wander from left to right over the displayed virtual motor vehicle 24. Furthermore, the person 18 can move forward or backward, for example, and his virtual relative position in relation to the virtual motor vehicle 24 likewise changes in accordance with the detected change in position of the person 18. If the person 18 now raises his hands 20, 22 in front of his face, for example, then corresponding virtual hands 28, 30 are displayed within the virtual surroundings 26 by the virtual reality goggles 12. The person 18 thus sees the virtual hands 28, 30 through the virtual reality goggles 12 exactly as he would see his real hands 20, 22 with the virtual reality goggles 12 removed.

If the person 18 changes the positioning of his hands 20, 22, then this is thus accordingly detected by the detection device 16, this information being forwarded to the control device 14. As a result, the control device 14 alters the positioning of the virtual hands 28, 30 by appropriate actuation of the virtual reality goggles 12. By appropriate movements of his hands 20, 22, the person 18 can put the virtual hands 28, 30 into the virtual motor vehicle 24. If the person 18 virtually moves toward the virtual motor vehicle 24, for example, and in so doing extends his hands 20, 22, then it might be that the virtual hands 28, 30 are put into the passenger door, for example. As soon as the virtual hands 28, 30 enter the passenger door, the control device 14 actuates the virtual reality goggles 12 such that the passenger door is turned partially or completely transparent in the area where the virtual hands 28, 30 enter. As a result, inner structures of the passenger door that are not depicted in this case are displayed by the virtual reality goggles 12. As soon as the virtual hands 28, 30 pass through the door completely, it is thus possible for the eyes to be allowed to see the interior of the virtual motor vehicle 24, for example, specifically without the door needing to be opened.

In this instance, there may be provision for a kind of enveloping body, not depicted in this case, to be placed around the virtual hands 28, 30, for example as a spherical enveloping body, that area of the passenger door through which the enveloping body passes being turned semitransparent or completely transparent in the example. In that case, a substantially larger area of the passenger door is thus turned transparent or semitransparent, which means that the wearer 18 of the virtual reality goggles 12 obtains a broader view of the inner structures of the passenger door or, depending on the depth of entry of the virtual hands 28, 30, also of elements of the virtual motor vehicle 24 that are behind the passenger door.

Alternatively, it is also possible, by way of example, for the person 18 to extend his hands 20, 22 and therefore to move his virtual hands 28, 30 again into a particular component of the displayed virtual motor vehicle 24, as a result of which this component is depicted broken down into its individual parts in the form of an explosion animation. This allows the person 18 to display a wide variety of assemblies of the virtual motor vehicle 24 in an explosion depiction so as to look at a wide variety of details and individual components more precisely.

Furthermore, it is also possible for gestures of the hands 20, 22 to be detected and applicable pointing or manipulation actions to be implemented within the displayed virtual surroundings 26 by the virtual reality goggles 12. By way of example, it is possible for the person 18 to extend an index finger, with a virtual pointer or laser pointer that virtually lengthens a finger axis of the index finger being displayed within the virtual surroundings 26 as soon as this action is detected.

Further, it is also possible for a virtual element to be grasped by one of the virtual hands 28, 30 in accordance with a grasping gesture performed with one of the hands 20, 22 and to be moved within the virtual surroundings in accordance with a movement performed with one of the hands 20, 22. By way of example, it would be possible for the person 18 to use the displayed virtual hands 28, 30 to grasp the exterior mirror of the virtual motor vehicle 24 and push it aside, as a result of which the exterior mirror is moved within the virtual surroundings 26 and more or less virtually removed from the remainder of the virtual motor vehicle 24 and moved. The same procedure can be used for a wide variety of components and assemblies of the virtual motor vehicle 24 by virtue of the person 18 performing applicable grasping gestures and movements with his hands 20, 22 in reality in order to manipulate and move the displayed virtual motor vehicle 24 or other virtual elements, not depicted here, that are within the virtual surroundings 26.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for operating a display system, comprising:
   displaying a virtual object arranged in virtual surroundings by virtual reality goggles worn by a person;
   detecting three dimensions of at least one hand of the person in real surroundings;

positioning at least one virtual hand within the virtual surroundings in accordance with the at least one hand detected in the real surroundings;

altering depiction of a first area of the virtual object that the virtual hand enters, as at least one of at least partially transparent and broken down into individual components in an explosion animation;

displaying an enveloping body around the virtual hand; and at least one of including the area of the virtual object into which the enveloping body moves as at least partially transparent, and as soon as an extended index finger is detected, displaying one of a virtual pointer and a laser pointer that virtually lengthens a finger axis of the index finger within the virtual surroundings.

2. The method as claimed in claim 1, wherein the virtual hand is displayed within the virtual surroundings by the virtual reality goggles.

3. The method as claimed in claim 2, wherein the enveloping body is spherical.

4. The method as claimed in claim 3, wherein inner structures of the virtual object that were not yet visible before the area was turned partially or completely transparent are displayed after the area is turned partially or completely transparent.

5. The method as claimed in claim 4, further comprising:
detecting three-dimensional gestures by the person performed with the at least one hand; and
displaying manipulation actions, corresponding to the three-dimensional gestures, at least one of within the virtual surroundings and on the virtual object.

6. The method as claimed in claim 5,
further comprising detecting a virtual element in accordance with a grasping gesture performed by the fingers, and
wherein the displaying of the manipulation actions includes grasping by virtual fingers and moving the virtual element within the virtual surroundings in accordance with a movement performed with the at least one hand.

7. The method as claimed in claim 1, wherein the enveloping body is spherical.

8. The method as claimed in claim 1, wherein inner structures of the virtual object that were not yet visible before the area was turned partially or completely transparent are displayed after the area is turned partially or completely transparent.

9. The method as claimed in claim 1, further comprising:
detecting three-dimensional gestures by the person performed with the at least one hand; and
displaying manipulation actions, corresponding to the three-dimensional gestures, at least one of within the virtual surroundings and on the virtual object.

10. The method as claimed in claim 1, further comprising:
altering a position of the virtual hand in response to change of a position of the at least one hand detected by the detecting, and
displaying at least one other virtual object at least partially visible through the first area of the virtual object, when the depiction of the first area of the virtual object is altered to be at least partially transparent as the virtual hand enters the virtual object.

11. The method as claimed in claim 10, wherein, the virtual object is a virtual door of a virtual vehicle and when the first area is altered to be at least partially transparent, a virtual interior of the virtual vehicle is at least partially visible through the virtual door without opening the door.

12. A display system, comprising:
virtual reality goggles, wearable by a person, configured to display a virtual object arranged in virtual surroundings;
a detection device configured to detect three dimensions of at least one hand of the person in real surroundings;
a control device configured to
position a virtual hand within the virtual surroundings in accordance with the at least one hand detected in the real surroundings,
alter depiction of a first area of the virtual object that the virtual hand enters, as at least one of at least partially transparent and broken down into individual components in an explosion animation,
display an enveloping body around the virtual hand, and
at least one of include the area of the virtual object into which the enveloping body moves as at least partially transparent, and as soon as an extended index finger is detected, display one of a virtual pointer and a laser pointer that virtually lengthens a finger axis of the index finger within the virtual surroundings.

13. The display system as claimed in claim 12,
wherein the control device is further configured to alter the position of the virtual hand in response to change of a position of the at least one hand detected by the detection device, and
wherein, when the depiction of the first area of the virtual object is altered to be at least partially transparent as the virtual hand enters the virtual object, at least one other virtual object is at least partially visible through the first area of the virtual object.

14. The display system as claimed in claim 13, wherein, the virtual object is a virtual door of a virtual vehicle and when the first area is altered to be at least partially transparent, a virtual interior of the virtual vehicle is at least partially visible through the virtual door without opening the door.

* * * * *